(12) United States Patent
Spisic et al.

(10) Patent No.: US 9,851,704 B2
(45) Date of Patent: Dec. 26, 2017

(54) WELDING POWER SOURCE AND METHOD FOR CONTROLLING THE SAME

(75) Inventors: Bernhard Spisic, Hinzenbach (AT); Thomas Eisenkolb, Fischlham (AT); Patrick Kliemstein, Waizenkirchen (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 898 days.

(21) Appl. No.: 14/232,368

(22) PCT Filed: Jul. 12, 2012

(86) PCT No.: PCT/AT2012/050101
§ 371 (c)(1),
(2), (4) Date: May 5, 2014

(87) PCT Pub. No.: WO2013/006885
PCT Pub. Date: Jan. 17, 2013

(65) Prior Publication Data
US 2014/0257589 A1    Sep. 11, 2014

(30) Foreign Application Priority Data
Jul. 14, 2011   (AT) ........................................ 1036/11

(51) Int. Cl.
  *B05B 15/02*   (2006.01)
  *G05B 15/02*   (2006.01)
  (Continued)

(52) U.S. Cl.
  CPC ............ *G05B 15/02* (2013.01); *B23K 9/1006* (2013.01); *G06F 8/34* (2013.01)

(58) Field of Classification Search
  CPC ...... G05B 15/02; G05B 15/05; G05B 19/418; G05B 19/41835; G06F 8/34; B23K 9/1006
  (Continued)

(56) References Cited

U.S. PATENT DOCUMENTS 5,683,598 A * 11/1997 Moro .................... B23K 26/702
                                                                219/108
6,002,104 A * 12/1999 Hsu ...................... B23K 9/0953
                                                                219/130.5
(Continued)

FOREIGN PATENT DOCUMENTS

| CN | 1256654 | 6/2000 |
| CN | 1328495 | 12/2001 |

(Continued)

OTHER PUBLICATIONS

Japan Office action, dated Feb. 3, 2015.
(Continued)

*Primary Examiner* — Jason Mitchell
(74) *Attorney, Agent, or Firm* — Greenblum & Bernstein, P.L.C.

(57) ABSTRACT

The invention relates to a method for configuring an interface of a welding power source (31, 41, 51, 61, 81, 91), said interface comprising at least one external connection (201 . . . 206). Defined graphic symbols of a software are used for configuration, the edges of said graphic symbols having bulges and/or indentations which interlockingly engage with corresponding bulges and/or indentations of a second graphic symbol. The configuration process comprises the allocation of a parameter of the welding device to an internal and/or external connection (101 . . . 105) and optionally establishing a logic link by stringing the graphic symbols together. The invention further relates to a welding power source (31, 41, 51, 61, 81, 91) and to a computer
(Continued)

program which are set up for performing or storing the process according to the invention.

9 Claims, 10 Drawing Sheets

(51) Int. Cl.
G06F 9/44 (2006.01)
B23K 9/10 (2006.01)

(58) Field of Classification Search
USPC .......................... 717/106, 107, 109; 700/297
See application file for complete search history.

(56) References Cited

U.S. PATENT DOCUMENTS

| | | | |
|---|---|---|---|
| 6,151,640 A | 11/2000 | Buda et al. | |
| 6,605,800 B1 | 8/2003 | Schick et al. | |
| 6,642,481 B2 | 11/2003 | Sievert et al. | |
| 6,700,097 B1* | 3/2004 | Hsu | B23K 9/09 |
| | | | 219/130.5 |
| 6,984,805 B2 | 1/2006 | Shimogama et al. | |
| 7,220,941 B2 | 5/2007 | Niedereder et al. | |
| 7,291,808 B2 | 11/2007 | Burgstaller et al. | |
| 2002/0166849 A1 | 11/2002 | Sievert et al. | |
| 2003/0005407 A1* | 1/2003 | Hines | G06F 8/36 |
| | | | 717/104 |
| 2003/0195997 A1* | 10/2003 | Ibert | G06F 9/542 |
| | | | 719/318 |
| 2004/0015816 A1* | 1/2004 | Hines | G06F 8/47 |
| | | | 717/101 |
| 2004/0026391 A1* | 2/2004 | Oberzaucher | B23K 9/0953 |
| | | | 219/130.1 |
| 2004/0232128 A1 | 11/2004 | Niedereder et al. | |
| 2005/0205541 A1 | 9/2005 | Burgstaller et al. | |
| 2005/0246682 A1* | 11/2005 | Hines | G06F 11/362 |
| | | | 717/109 |
| 2007/0181548 A1* | 8/2007 | Kaddani | B23K 9/1062 |
| | | | 219/130.21 |
| 2008/0116185 A1 | 5/2008 | Luck et al. | |
| 2008/0270978 A1* | 10/2008 | Leung | G06F 9/4443 |
| | | | 717/106 |
| 2009/0071949 A1* | 3/2009 | Harris | B23K 9/1062 |
| | | | 219/130.1 |
| 2009/0125131 A1* | 5/2009 | Eldridge | G05B 15/02 |
| | | | 700/87 |
| 2009/0313549 A1* | 12/2009 | Casner | B23K 9/0953 |
| | | | 715/740 |
| 2010/0223042 A1* | 9/2010 | Parker | G06F 17/5022 |
| | | | 703/6 |
| 2011/0073569 A1* | 3/2011 | Rappl | B23K 9/095 |
| | | | 219/73.2 |
| 2012/0241429 A1* | 9/2012 | Knoener | B23K 9/095 |
| | | | 219/130.01 |
| 2014/0238965 A1* | 8/2014 | Spisic | B23K 9/1087 |
| | | | 219/132 |

FOREIGN PATENT DOCUMENTS

| | | |
|---|---|---|
| CN | 1553839 | 12/2004 |
| CN | 1646252 | 7/2005 |
| CN | 101497147 | 8/2009 |
| JP | 2002-527246 | 8/2002 |
| JP | 2003-103366 | 4/2003 |
| JP | 2005-500911 | 1/2005 |
| JP | 2005-527381 | 9/2005 |
| JP | 2008-264928 | 11/2008 |
| JP | 2009-178763 | 8/2009 |
| JP | 2010-029876 | 2/2010 |
| WO | WO 99/37435 | 7/1999 |
| WO | 02/058877 | 8/2002 |
| WO | WO 02/058877 | 8/2002 |
| WO | WO 03/084706 | 10/2003 |

OTHER PUBLICATIONS

China Office action, dated Nov. 25, 2014.

U.S. Appl. No. 14/232,403 to Bernhard Spisic et al., filed Jan. 13, 2014.

* cited by examiner

WELDING POWER SOURCE AND METHOD FOR CONTROLLING THE SAME

The invention relates to a method for controlling a welding power source, to a welding power source and to a computer program product having a computer program stored thereon.

Ever increasing networking in the field of industrial processes means that devices which are used in such processes are as a rule equipped to communicate with other devices. An example of a device of the mentioned type is a welding power source which can generally be used for the production of welds. In addition to the actual power source which forms the "heart", as it were, of a welding power source, the welding power source can also comprise further units which are usually required for welding. For example, a welding power source can comprise means for generating and controlling a flow of welding gas and/or means for cooling the welding torch.

Networking involves risks insofar as a change in operating parameters can result in unforeseeable consequences, if the interface to further devices has not been created carefully. In particular, the relatively high currents which flow during welding pose a considerable potential danger. For example, a malfunction in a welding robot could result in the welding voltage being applied to parts other than the workpiece and in these being damaged or even destroyed. Danger to people cannot be ruled out either.

The mentioned interface comprises at least one internal connection to a control means of the welding power source and at least one external connection for the connection of external machines. For example, the welding power source can be connected to an industrial robot, thereby creating a welding robot. The robot and the welding power source are often provided by different manufacturers, thus making it necessary to coordinate the interfaces of the mentioned devices with one another.

As a rule, this happens as a special request from a customer who would like to connect devices of this type to one another. In this case, the manufacturers of the devices then create an interface intended specifically for the customer. However, standardised interfaces or flexible interfaces which make it possible to combine a welding power source with other machines according to the "plug and play" model do not exist.

This leads to some disadvantages. For example, the creation of a specific interface and the setup of a welding power source are relatively time-consuming and require a great amount of expert knowledge. In addition, this procedure also requires knowledge about external machines, as an engineer employed by the welding power source manufacturer should also know about the mode of operation of the machine to be connected thereto in order to be able to produce a correctly functioning interface and to be able to correctly set up the welding power source. Since there are vast numbers of different types of machines, it is virtually impossible to be familiar with every conceivable combination of welding power source with a (random) machine. However, even if this expert knowledge is largely available, then these highly-skilled employees are in most cases fully stretched, which means that there are long waiting times for the creation of an interface and for the setup of a welding power source. Due to the high installation costs of, for example, a welding robot, it is understandable that a customer may not be prepared to accept such a long waiting time. A further complicating factor is that, due to globalisation, technical staff often have to take on long journeys to set up a welding power source or to create the interface thereof on site. In particular, it is especially irritating if minor faults which arise in an interface which has already been delivered, or which arise in the setup of the welding power source have to be rectified.

Therefore the object of the invention is to provide an improved method controlling a welding power source, as well as an improved welding power source. In particular, the problems mentioned above are to be avoided.

The object of the invention is achieved by a method for configuring an interface of a welding power source, the interface comprising at least one external connection and predefined graphic symbols of a piece of software being used for configuration and bulges and/or indentations being formed on peripheral regions of the graphic symbols, which bulges and/or indentations are connected in a form-locking manner to corresponding indentations and/or bulges of a further graphic symbol, the configuration comprising the flowing steps:

allocating a parameter of the welding device to an internal and/or external connection;

and optionally establishing the logical link by stringing the graphic symbols together.

The object of the invention is further achieved with a welding power source having an interface, comprising:

an input device for inputting at least one value for at least one operating parameter of the welding power source, the interface comprising at least one external connection, characterised in that predefined graphic symbols of a piece of software are formed for configuration and bulges and/or indentations are arranged on peripheral regions of the graphic symbols, which bulges and/or indentations can be connected in a form-locking manner to corresponding indentations and/or bulges of a further graphic symbol, and in that the configuration comprises the flowing steps:

allocating a parameter of the welding device to an internal and/or external connection;

and optionally establishing the logical link by stringing the graphic symbols together.

The object of the invention is further achieved by a computer program product having a computer program of the initially mentioned type stored thereon, which product can be loaded into the memory of a personal computer or of a welding power source according to the invention and which implements the method according to the invention when the computer program is executed there.

It is thereby achieved according to the invention that the setup of a welding power source and the creation and programming of an interface of a welding power source is greatly simplified and thereby can be taken over by less well-trained staff. Serious errors at least can be avoided due to the testing according to the invention of the effects of a set value. Depending on the scope of the mentioned test, it is possible for setup errors and programming errors to be completely prevented. Due to the simplification, comprehensive specialised knowledge about the welding power source for the setup thereof and for creating an associated interface is no longer necessary, so that for example even the customer or the manufacturer of a machine connected to the welding power source is in a position to set up the welding power source and to program the interface thereof. It is thereby possible to avoid long waiting times and time-consuming journeys due to a shortage of staff, as described at the outset.

In addition to setting up the welding power source using a (physically present) machine connected thereto, it is also possible to set up the welding power source using a model thereof and using a model, connected thereto, of the machine which is connected thereto (for example using a model of the welding robot). The setup of the welding power source and definition of the interface is thus carried out "offline". Only when the result of the test provided according to the invention is positive are the setup procedures carried out in reality. In this manner, it is possible to prevent dangerous situations, such as the accidental ignition of a welding arc. The "offline" programming also reduces the downtime of the devices concerned.

Advantageous configurations and developments of the invention are provided in the subclaims and in the description combined with the figures.

It is advantageous when one or more from the following group is provided as operating parameter: welding current, welding voltage, current frequency, pulse rate, pulse duration, pulse-width ratio, operating state, system time. The mentioned operating parameters are often required for the control of a welding power source. Thus, it is advantageous to also provide the relevant operating parameters in the model of the welding power source.

It is advantageous when the model of the welding power source is represented as a set of programming commands and when one programming command allocates the at least one value to the at least one operating parameter. For example, a command can be provided which allocates a specific value to the operating parameter "welding current" or also to other operating parameters. The program code for the value allocation can then be compiled in a manner known per se and can subsequently be executed or directly interpreted.

It is also advantageous when the model of the welding power source is represented as a table and when one cell of the table contains the at least one value of the at least one operating parameter. In this variant of the invention, the welding current source is not set up by a program code in the conventional sense, but by the specific description of cells of a table. For example, the operating parameter "welding current" can in turn be allocated to a cell of the table. If this cell is described with a specific value, the welding current is set at this value, initially in the model and, when everything is correct, also in reality. Of course, this table can in turn be converted into a program code, as described previously. However, any other method for creating a code is also possible.

It is particularly advantageous when the model of the welding power source is represented as a graphic symbol and when the at least one operating parameter is represented as an input symbol and when an input of the at least one value allocates the mentioned value to the at least one operating parameter in the case of the input symbol. Thus, this variant of the invention provides the programmer of an interface with a GUI (graphical user interface). By influencing the input symbols which can be manipulated by a computer mouse, arrow keys, a keyboard or a joystick for example, it is possible to set a desired value for an operating parameter. Here again, this graphic arrangement can be converted into a program code, as described previously. However, any other method for creating a code is also possible.

It is advantageous when the interface comprises an interface definition which includes one or more interface functions from the following group: allocation of an internal connection to an external connection of the interface, scaling of values transmitted via the interface, conversion of a unit of a value transmitted thus, transformation of a data format of a value transmitted thus, inversion of a value transmitted thus and time delay of a value transmitted thus. The mentioned functions are often required when setting up and programming an interface of a welding power source. It is therefore advantageous to subject a requirement for a function of this type to a test according to the invention in order to avoid errors as far as possible when creating the interface.

It is advantageous when the interface is represented as a set of programming commands and when one programming command functionally links the at least one internal connection via an interface function with the at least one external connection. Thus, the allocation between the external connections and the internal connections takes place via a program code. For example, a command can be provided which connects an internal connection to an external connection, the interchanged values being inverted in each case. The program code for the definition of the interface can be compiled in a manner known per se and subsequently executed or directly interpreted.

It is also advantageous when the interface is represented as a table, in which case one cell of the table is allocated to the at least one internal connection and/or to the at least one external connection of the interface and contains an interface function which functionally links the at least one internal connection with the at least one external connection. In this variant of the invention, the interface is not programmed by a program code in the conventional sense, but by the specific description of cells of a table. For example, the internal connections can be allocated to the rows and the external connections can be allocated to the columns. If a cell is described with a specific interface function, then this is applied to the connections allocated to the relevant row and column. Of course, here again this table can be converted into a program code, as described previously. However, any other method for creating a code which runs in the interface is also possible.

It is particularly advantageous when the interface is represented as a graphic interface symbol of its at least one internal connection and of its at least one external connection and when the interface functions are represented as graphic interface function symbols, in which case an interface function symbol can be arranged between the at least one internal connection and the at least one external connection of the interface symbol in order to functionally link the at least one internal connection via the allocated interface function with the at least one external connection. Thus, this variant of the invention provides the programmer of an interface with a GUI (graphical user interface). By combining different interface function symbols which can be manipulated by a computer mouse, a keyboard, arrow keys, or a joystick for example, it is possible to realise a desired interface function. Here again, this graphic arrangement can be converted into a program code, as described previously. However, any other method for creating a code which runs in the interface is also possible.

In this respect, it is particularly advantageous when the outer form of the interface function symbols is configured such that the interface function symbols fit together like puzzle pieces when the allocated interface functions match one another functionally. In this manner, the programmer of an interface can clearly see during or before programming, which interface functions are mutually compatible and which are not. A pointless attempt at combining two incompatible interface functions, which is rejected by the plausibility test according to the invention is therefore prevented from the start. Since the interface function symbols are differentiated according to form, this variant of the invention is particularly suitable for use on black-and-white screens or for colour-blind people.

In this respect, it is also particularly advantageous when the outer form of the interface function symbols and of the interface symbol is configured such that the interface function symbols and the interface symbol fit together like puzzle pieces when the allocated interface functions functionally match the at least one internal connection and/or the at least one external connection. Here, it becomes apparent to the programmer of an interface in a very similar manner to the one previously described, which interface function can be combined with which internal or external connection and which cannot.

It is also particularly advantageous when the coloured appearance of the interface function symbols is configured such that the interface function symbols match in terms of colour when the allocated interface functions match functionally. Similarly to the form of an interface function symbol, the colour thereof can also play a part in indicating to the interface programmer which interface functions can be combined and which cannot. Of course, form and colour can be varied to more clearly illustrate the differences and to expand the range of combinations. For example, two identically formed but differently coloured interface function symbols can be allocated to different interface function symbols.

It is also particularly advantageous when the coloured appearance of the interface function symbols and of the interface symbol is configured such that the interface function symbols and the interface symbol match in terms of colour when the allocated interface functions functionally match the at least one internal connection and/or the at least one external connection. Here, it becomes apparent to the programmer of an interface in a very similar manner to the one previously described, which interface function can be combined with which internal or external connection and which cannot.

It is pointed out here that the variants mentioned in respect of the method according to the invention and the advantages resulting therefrom relate in equal measure to the welding power source according to the invention and to the computer program product according to the invention. This naturally also applies conversely. Furthermore, the above-mentioned measures can also be combined in any manner.

In order to gain a clearer understanding of the invention, it will be described in more detail with reference to the following figures, in which FIG. 1 schematically shows a welding machine or a welding device;

FIG. 2 schematically shows a welding robot connected to a welding power source according to the invention;

Figure 1:
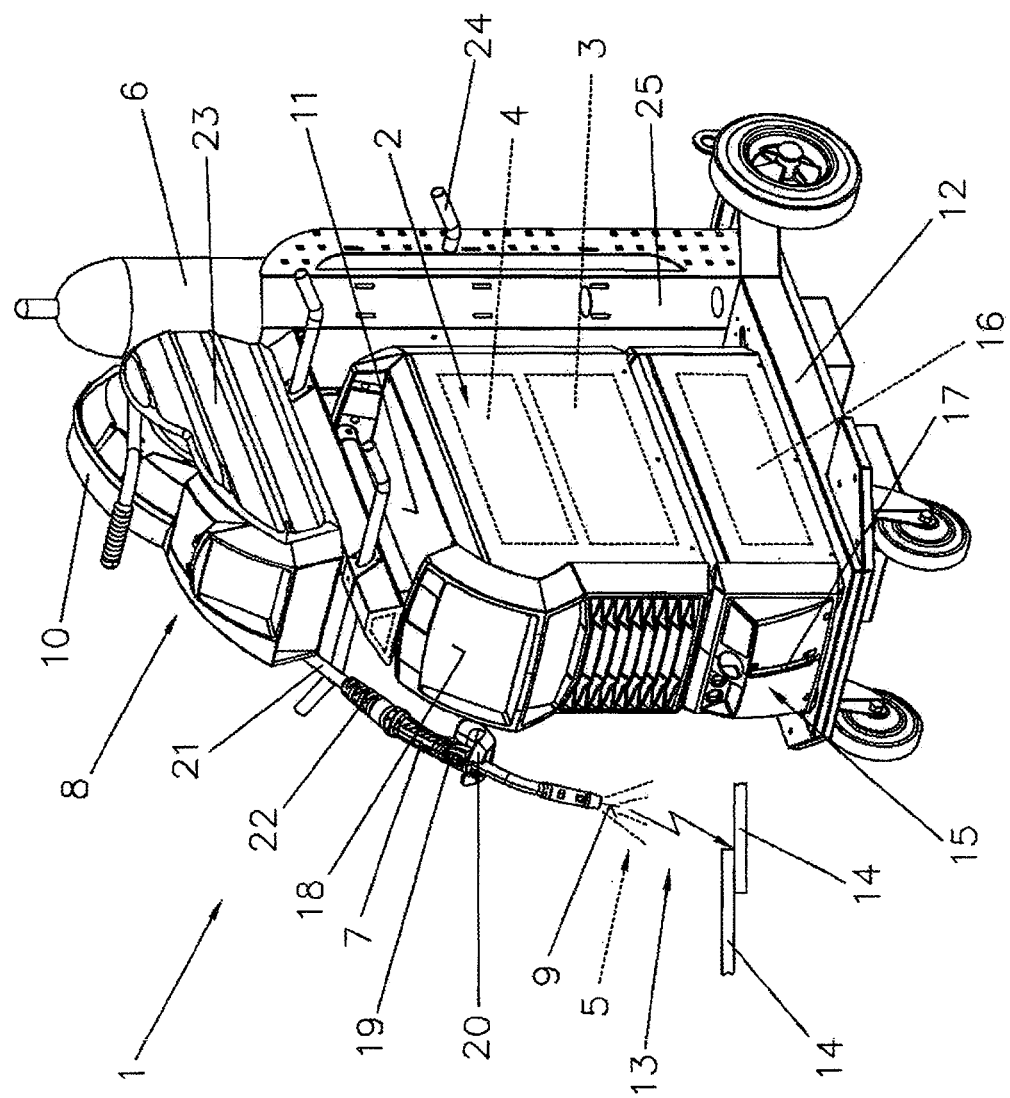

First of all, it should be noted that in the differently described embodiments, identical parts have been provided with the same reference numerals or with the same component names, it being possible for the disclosures contained in the entire description to be transferred analogously to the same parts having the same reference numerals or the same component names.

Furthermore, positional information chosen in the description, such as "above", "below", "at the side" etc. is based on the illustrated figure which is being directly described and, when the position is changed, is transferred analogously to the new position. In addition, individual features or combinations of features from the different embodiments which are illustrated and described can also be per se independent, inventive solutions or solutions according to the invention.

All the information concerning value ranges in the objective description should be understood such that it also includes any and all partial ranges thereof, for example, 1 to 10 should be understood such that all partial ranges, from the lower limit 1 and the upper limit 10 are also included, i.e. all partial ranges start with a lower limit of 1 or more and end with an upper limit of 10 or less, for example 1 to 1.7 or 3.2 to 8.1 or 5.5 to 10.

FIG. 1 shows a welding device 1 known per se or a welding plant for the most varied processes or methods, such as MIG/MAG welding or WIG/TIG welding or electrode welding methods, double wire/tandem welding methods, plasma or soldering methods etc.

The welding device 1 comprises a power source 2 with a power part 3 arranged therein, a control device 4 and further components and lines (not shown), such as a switch-over element, control valves etc. The control device 4 is connected to a control valve, for example, which is arranged in a supply line for a gas 5, in particular an inert gas, such as $CO_2$, helium or argon and the like, between a gas tank 6 and a welding torch 7 or torch.

Furthermore, the control device 4 can also control a wire feed device 8, often used in MIG/MAG welding, a filler material or a welding wire 9 being fed via a supply line from a feed drum 10 or a wire roll into the region of the welding torch 7. It is naturally possible for the wire feed device 8, as known in the prior art, to be integrated into the welding device 1, particularly into the housing 11 of the power source 2 and not to be positioned as an attachment on a carriage 12, as shown in FIG. 1. Here, this is a so-called "compact welding device" 1. In this respect, it is also possible that the wire feed device 8 is positioned directly on the welding device 2, i.e. that the housing 11 of the power source 2 is configured on the upper side to receive the wire feed device 8, so that the carriage 12 can be omitted.

It is also possible for the wire feed device 8 to feed the welding wire 9 or the filler material to the processing area outside the welding torch 7, in which case a non-consumable electrode is preferably arranged for this purpose in the welding torch 7, as is usual in WIG/TIG welding.

The current for building up an arc 13, in particular a working arc, between the electrode or the welding wire 9 and a workpiece 14, preferably formed from one or more parts, is fed to the welding torch 7, in particular to the electrode or the welding wire 9 via a welding line (not shown) from the power part 3 of the power source 2, the workpiece 14 to be welded being connected to the power source 2 via a further welding line (not shown) for the further voltage, in particular the earth cable and thus a circuit can be built up for a process via the arc 13 or the formed plasma beam. When a torch having an internal arc 13 is used, the two welding lines (not shown) are guided to the torch so that a corresponding circuit can be built up in the torch, as can be the case for a plasma torch.

To cool the welding torch 7, said torch 7 can be connected via a cooling device 15, with the interconnection of possible components such as a flow monitor, to a liquid container, in particular to a water container 16 having a fill level indication 17, as a result of which the cooling device 15, in particular a liquid pump, used for the liquid located in the water container 16, is started on activation of the welding torch 7, and thus the welding torch 7 can be cooled. As shown in the illustrated embodiment, the cooling device 15 is positioned on the carriage 12, onto which the power source 2 is subsequently placed. In this respect, the individual components of the welding plant, i.e. the power source 2, the wire feed device 8 and the cooling device 15 are configured such that they have appropriate projections and recesses so that they can be stacked or positioned securely on top of one another.

The welding device 1, in particular the power source 2 further comprises an input/output device 18, via which the most varied welding parameters, types of operation or welding programs of the welding device 1 can be set and retrieved and displayed. In this respect, the welding parameters, types of operation or welding programs set by the input and/or output device 18 are forwarded to the control device 4 which then controls the individual components of the welding plant or of the welding device 1, or presets appropriate regulation or control set values. Here, it is also possible that when an appropriate welding torch 7 is used, setting procedures can also be performed by the welding torch 7, in which case the welding torch 7 is equipped for this purpose with a welding torch input and/or output device 19. The welding torch 7 is preferably connected to the welding device 1, in particular to the power source 2 or to the wire feed device 8 by a data bus, in particular a serial data bus. To start the welding process, the welding torch 7 generally has a starting switch, not shown, so that the arc 13 can be ignited by actuating the starting switch. To protect against the considerable heat irradiation from the arc 13, it is possible for the welding torch 7 to be equipped with a heat protection shield 20.

Furthermore, in the illustrated embodiment, the welding torch 7 is connected to the welding device 1 or to the welding plant by a hose assembly 21, the hose assembly 21 being attached to the welding torch 7 by a kink protector 22. Arranged in the hose assembly 21 are the individual lines, such as the supply line or lines for the welding wire 9, for the gas 5, for the cooling circuit, for the data transmission etc., from the welding device 1 to the torch 7, whereas the earth cable is preferably connected externally to the power source 2. The hose assembly 21 is connected to the power source 2 or to the wire feed device 8 by a coupling device (not shown), whereas the individual lines in the hose assembly 21 are attached to or in the torch 7 with a kink protector.

To ensure an appropriate strain relief of the hose assembly 21, said hose assembly 21 can be connected to the housing 11 of the power source 2 or to the wire feed device 8 by a strain relief device (not shown).

As a basic principle, it should be mentioned that not all the previously mentioned components have to be used for the different welding methods or welding devices 1, such as WIG devices or MIG/MAG devices or plasma devices. For this, it is possible for example for the welding torch 7 to be configured as an air-cooled welding torch 7, so that the cooling device 15 for example can be omitted. It is also possible for further parts or components, such as an abrasion protector 23 to be arranged and used on the wire feed device 8 or for an option carrier 24 to be arranged and used on a holding device 25 for the gas tank 6 etc.

Figure 2:
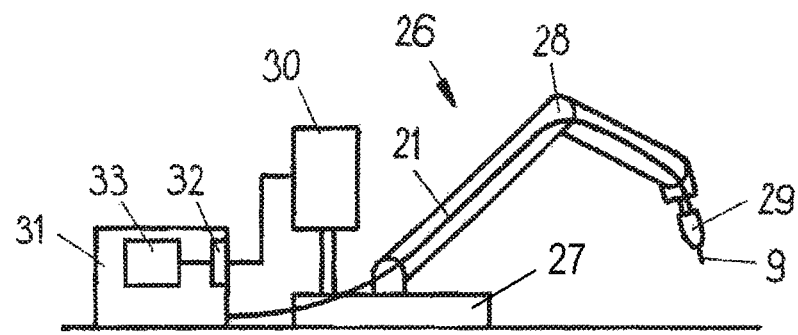

FIG. 2 is a greatly simplified illustration of a welding robot 26 with a robot base 27, a robot arm 28 and a welding head 29, from which a welding wire 9 protrudes. The welding robot 26 shown in FIG. 2 comprises a first drive system, known per se, with a control means 30, known per se, for the welding head 29. Connected to the welding robot 26 is a welding power source 31 according to the invention with a control means, formed by a microprocessor/microcontroller, and an interface 32 connected thereto. Specifically, the welding head 29 is connected to the welding power source 31 by a hose assembly 21. Furthermore, the control means 30 of the welding robot 26 is connected to the welding power source 31 via the interface 32. In addition, the welding robot 26 and the welding power source 31 can comprise the assemblies, mentioned in respect of FIG. 1, of a composition known in principle.

Figure 3:
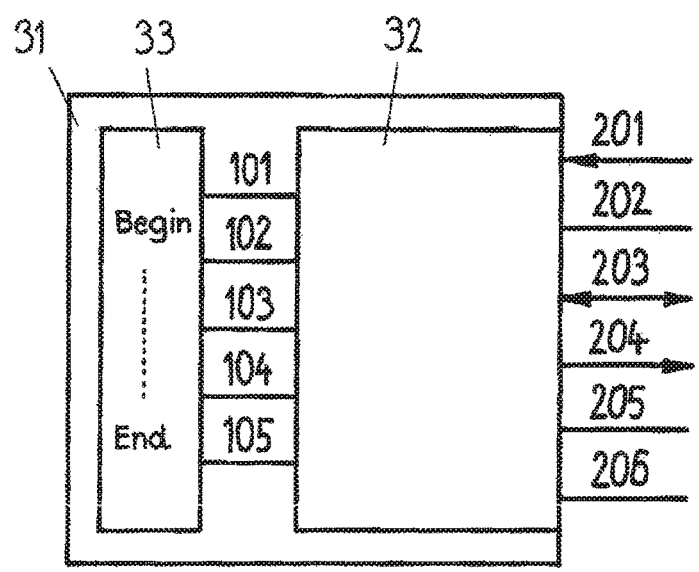
FIG. 3 shows the welding power source from FIG. 2 in detail, the model of the welding power source being represented as a set of programming commands.

FIG. 3 shows a simplified electrical and logical circuit diagram of the welding power source 31 from the arrangement according to FIG. 2. The welding power source 31 comprises an interface 32 which comprises five internal connections 101 . . . 105 to a processor 33 for controlling the welding power source 31, and six external connections 201 . . . 206. These connections 101 . . . 105 and 201 . . . 206 are not necessarily configured as independent physically present lines. Instead, it is also possible that they form logical data channels which are transmitted, for example, in time-division multiplex by a serial communication connection.

In the illustrated example, the external connection 201 is configured as an input, the external connection 203 is configured as an input/output (bidirectional) and the external connection 204 is configured as an output. The other external connections 202, 205 and 206 in this example are not occupied. The allocation between the external connections 201 . . . 206 and the internal connections 101 . . . 105 is carried out by an interface definition, the creation of which is presented in detail in FIGS. 7 to 9.

According to the invention, a method for controlling a welding power source comprises the following steps:
acquiring at least one value for at least one operating parameter of the welding power source 31,
setting this at least one value in a model of the welding power source 31,
testing a) the effects of this at least one value on a real machine 26 which is connected to the model of the welding power source 31 by an interface 32, using feedback obtained from the machine 26, or
testing b) the effects of this at least one value on a model of this machine 26 which is connected to the model of the welding power source 31 by a model of an interface 32, and
setting the at least one value in the real welding power source 31 if no negative effects have been established in the test step.

Figure 6:
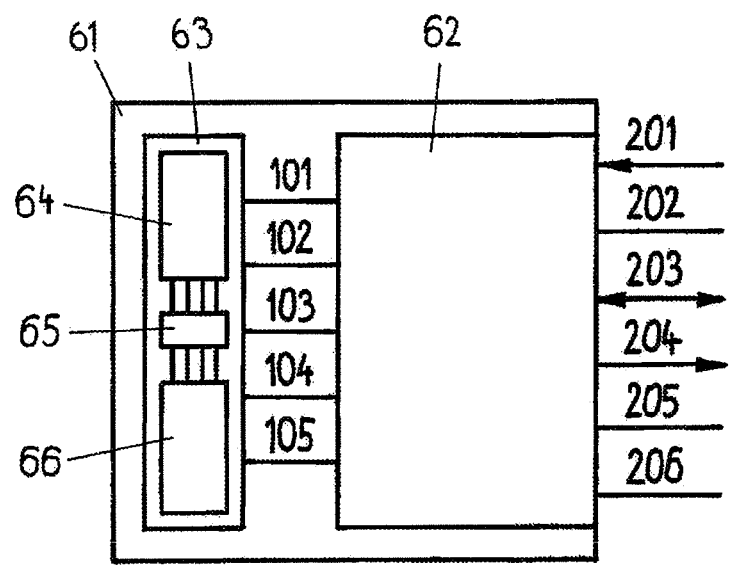
FIG. 6 shows an example of the welding power source in which a model thereof is connected via a modelled interface to a model of a welding robot.

In the following, variant a) will be described in more detail with reference to FIGS. 2 and 3. Reference is made to FIG. 6 with regard to variant b).

In the illustrated example, a program which models the welding power source 31 runs in the control means 33 which is formed, for example, by a microprocessor/microcontroller and is responsible very generally for the control of sequences known per se in a welding power source 31. In FIG. 3, this program is symbolised by a command sequence which is not defined in more detail and is delimited by the instructions "begin" and "end". This program code can be compiled or interpreted in a manner known per se. Thus, the model of the welding power source 31 is represented as a set of programming commands, a value being allocated to an operating parameter by a programming command.

If the welding power source 31 receives a request to change an operating parameter of the welding power source 31, for example via an input device thereof or via the interface 32, then this request is not immediately implemented in the real welding power source, but is initially executed in the model running in the control means 33. For example, a welding current, a welding voltage or the like can thus be adjusted without this producing a real flow of current via the welding wire.

In a further step, the effects of this at least one value on the real machine, in the specific example on the welding robot 26 or on the control means 30 thereof are examined. As can be seen in FIG. 2, the control means 30 is connected via the interface 32 to the welding power source 31 and thereby is also connected to the model running in the control means 33. Setting an operating parameter in this model thus leads to a reaction or to feedback from the welding robot 26 which, in turn, is received via the interface 32. Only if no negative effects are established in this test phase will the selected value, i.e. for example a welding current, also be set in the real welding current source 31. Adjustments to the welding power source 31 can thus be advantageously tested in a safe manner before they are actually implemented.

Figure 4:
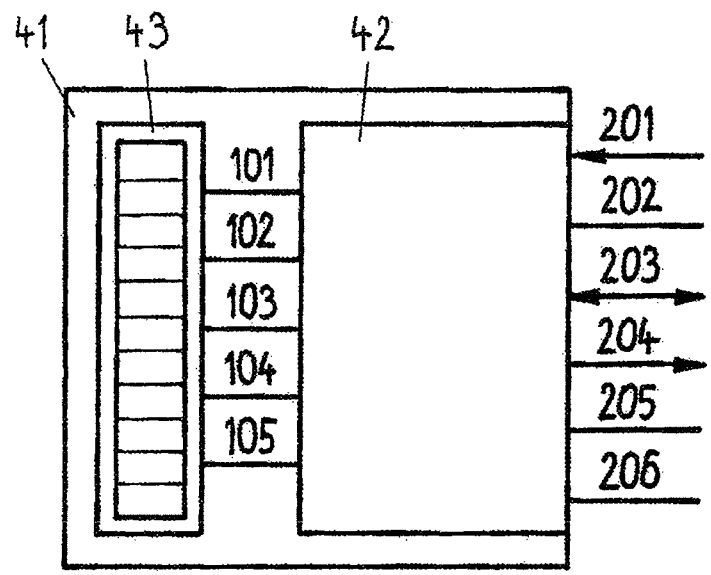
FIG. 4 shows an alternative welding power source, the model of the welding power source being represented as a table.

FIG. 4 shows an alternative embodiment of a welding power source 41 which is very similar to the welding power source 31 shown in FIG. 3. In contrast, however, the model of the welding power source 41 is not represented by a program code, but as a table, in which one cell of the table contains one value of an operating parameter. For example, one cell can be provided for the welding current. If the value in the cell is changed, then the welding current is also set accordingly, although with a preceding consideration of the effects, as described in respect of FIG. 3.

Figure 5:
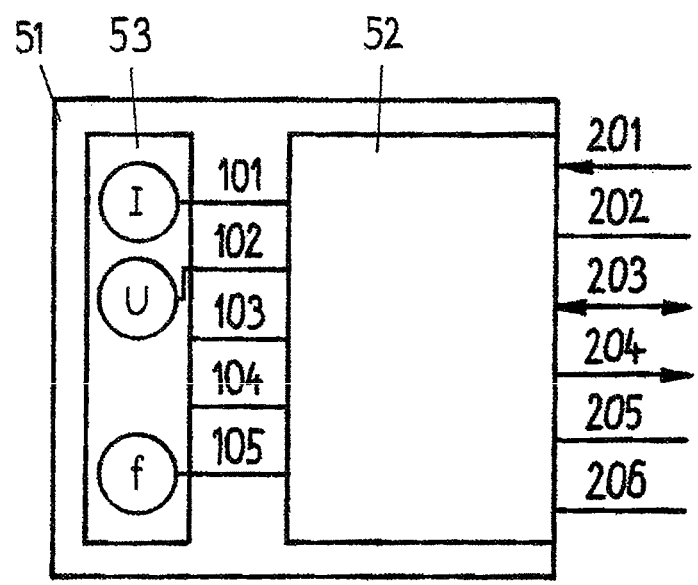
FIG. 5 shows a further alternative welding power source, the model of the welding power source being represented as a graphic symbol.

FIG. 5 shows a further alternative embodiment of a welding power source 51 which is very similar to the welding power source 31 shown in FIG. 3. In contrast, however, the model of the welding power source 51 is not represented by a program code, but as a graphic symbol and the at least one operating parameter is represented as an input symbol, an input of the at least one value allocating the mentioned value to the at least one operating parameter in the case of the input symbol. Specifically, in the present example, three input symbols are provided. An input symbol "I" which is connected to the internal connection 101 and is provided for setting the welding current, an input symbol "U" which is connected to the internal connection 102 and is provided to set the welding voltage and an input symbol "f" which is connected to the internal connection 105 and is provided to set a converter frequency. If an input symbol or the allocated value is changed, then the corresponding operating parameter is also set accordingly, again with a preceding consideration of the effects, as described in respect of FIG. 3. The input symbols which have been stated are naturally to be considered purely as examples. Of course, it is also possible that further/other input symbols are provided for further/other operating parameters. It is also naturally possible that these are in another form.

FIG. 6 shows a further possibility of how the effects of a change of an operating parameter can be tested. Specifically, an effect of this at least one value on a model of this machine 26 which is connected to the model of the welding power source 31 by a model of an interface 32 is considered. For this purpose, FIG. 6 shows in the control means 31 which is again formed by a microprocessor/microcontroller, a model 64 of the control means 63 of the welding power source 61, a model 65, connected thereto, of the interface 62 and a model 66, connected thereto, of the welding robot 26 or of the control means 30 thereof. Of course, the mentioned models do not have to represent the entirety of the relevant devices, but can merely reproduce a relevant segment thereof. This applies in particular to model 64 and to model 66.

In this variant of the invention, adjustments to a welding power source 61 can thus be fully tested in a virtual world before they are set in the real welding power source 61. Thus, the test can also advantageously be carried out without a welding robot 26 which is really present. In particular, the method according to the invention for controlling the welding power source 61 can also be implemented in a PC (block 63 can then be seen as the processor of the relevant PC), as a result of which sequences can be tested "offline", i.e. completely independently of a really present welding power source 61 and of a really present welding robot 26.

It is pointed out here that the steps of the method according to the invention do not necessarily follow one another immediately, but can also be delayed in time. This applies in particular to the step in which the at least one value is set in the real welding power source 31, for example when the programming takes place offline as described above and the conversion into reality only takes place at a later time.

Figure 7:
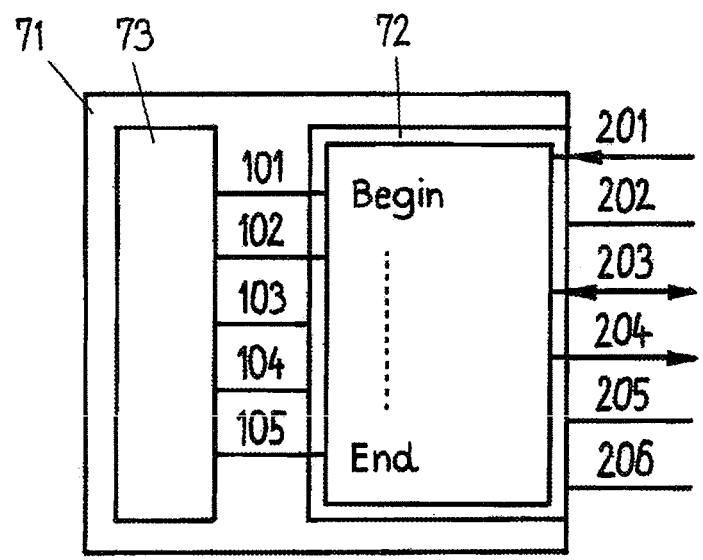
FIG. 7 shows a basic circuit diagram of a welding power source according to the invention in which the interface functions are represented as a set of programming commands.

FIG. 7 shows a first example of an interface 72 of a welding power source 71 which could be used, for example, in an arrangement according to FIGS. 3 to 5. As previously stated, the interface 72 comprises five internal connections 101 . . . 105 to the processor 73 and six external connections 201 . . . 206. These connections 101 . . . 105 and 201 . . . 206 are not necessarily configured as independent physically present lines. Instead, it is also possible that they form logical data channels which are transmitted, for example, in time-division multiplex by a serial communication connection.

In the illustrated example, as already stated, the external connection 201 is configured as an input, the external connection 203 is configured as an input/output (bidirectional) and the external connection 204 is configured as an output. In this example, the other external connections 202, 205 and 206 are not occupied. The external connections 201, 203 and 204 are allocated to the internal connections 101, 102 and 105. In this example, the internal connections 103 and 104 are not occupied. The allocation between the external connections 201, 203 and 204 and the internal connections 101, 102 and 105 takes place via a program code. For example, a command can be provided which connects the internal connection 101 to the external connection 201. Furthermore, it is possible for a command to be provided which connects the internal connection 102 to the external connection 203, the interchanged values being inverted in each case. Finally, it is possible for a further command to be provided which connects the internal connection 105 to the external connection 204, the interchanged values being multiplied by two. Of course, the specified links are to be seen purely as examples. Naturally, any other link is also possible.

The interface 71 is thus represented as a set of programming commands, one programming command functionally linking an internal connection 101, 102 and 105 with an external connection 201, 203 and 204 via an interface function. In FIG. 7, this is symbolised by a command sequence which is not defined in more detail and is delimited by the instructions "begin" and "end". This program code can be complied or interpreted in a manner known per se.

Figure 8:
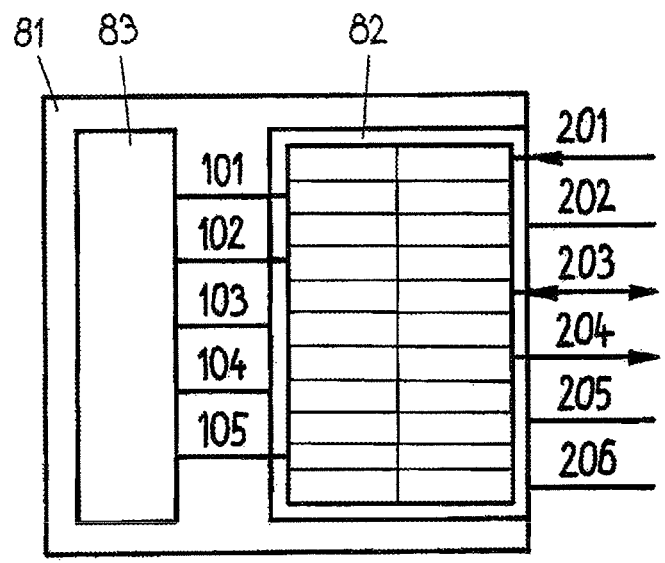
FIG. 8 shows a basic circuit diagram of a welding power source according to the invention in which the interface functions are represented as a table.

FIG. 8 shows an alternative embodiment of a welding power source 81 according to the invention which is very similar to the welding power source 71 shown in FIG. 7. However, in contrast, the internal connections 101, 102 and 105 and the external connections 201, 203 and 204 are linked together not via a program code but via a table. The interface 82 is thus represented as a table in which one cell of the table is allocated to an internal connection 101, 102 and 105 and/or to an external connection 201, 203 and 204 of the interface and contains an interface function which functionally links an internal connection 101, 102 and 105 with an external connection 201, 203 and 204. For example, the internal connections 101 . . . 105 can be allocated to the rows of the table and the external connections 201 . . . 206 can be allocated to the columns. If a cell is described at the intersection point of a specific row and a specific column with an interface function, then the relevant internal connection 101 . . . 105 and the relevant external connection 201 . . . 206 are linked functionally with one another via the corresponding interface function.

Remaining with the previous example, a "1" can be entered in the cell allocated to the internal connection 101 and to the external connection 201 in order to connect them. Similarly, a "−1" can be entered in the cell allocated to the internal connection 102 and to the external connection 203 in order to connect them and to invert the transmitted values. Furthermore, "x2" can be entered in the cell allocated to the internal connection 105 and to the external connection 204 in order to connect them and to multiply the interchanged values by two.

Figure 9:
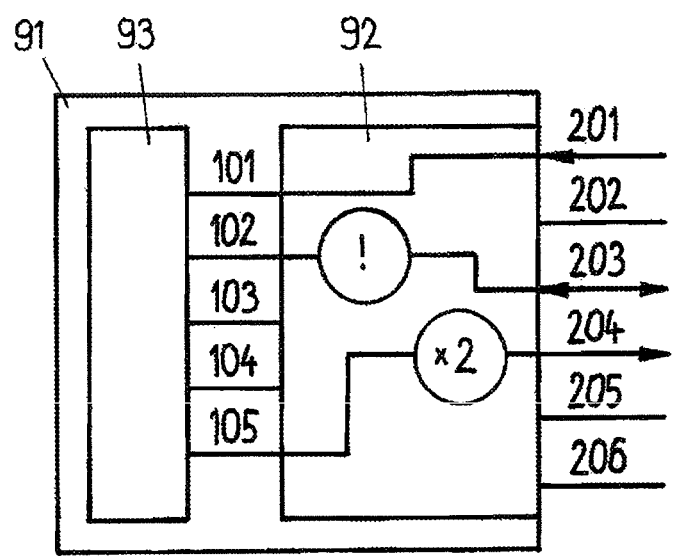
FIG. 9 shows a basic circuit diagram of a welding power source according to the invention in which the interface functions are represented as graphic symbols.

FIG. 9 shows an alternative embodiment of a welding power source 91 according to the invention which is again very similar to the welding power source 71 shown in FIG. 7. However, in contrast, the internal connections 101, 102 and 105 and the external connections 201, 203 and 204 are linked together not via a program code but via graphic symbols.

The interface 92 is thus represented as a graphic interface symbol of its internal connections 101 . . . 105 and of its external connections 201 . . . 206 and the interface functions are represented as graphic interface function symbols. It is possible to arrange an interface function symbol between the internal connections 101 . . . 105 and the external connections 201 . . . 206 of the interface symbol in order to functionally link an internal connection 101 . . . 105 to an external connection 201 . . . 206 via the allocated interface function.

Specifically, in the present example, the internal connection 101 is connected to the external connection 201 via the graphic symbol "line", so that data can be transmitted between the internal connection 101 and the external connection 201. Furthermore, the internal connection 102 is connected to the external connection 203 via the graphic symbol "!", so that data can be transmitted between the internal connection 102 and the external connection 203, which data is, however, inverted during transmission. Finally, the internal connection 105 is connected to the external connection 204 via the graphic symbol "x2", so that data can be transmitted between the internal connection 105 and the external connection 204, which data is multiplied by two during transmission.

According to the invention, a request to functionally link an internal connection 101 . . . 105 via an interface function, selected from a set of interface functions, with an external connection 201 . . . 206, is subjected to a plausibility test. Only if the result of the plausibility test is positive will the request be carried out. This plausibility test can be carried out per se at any time during the course of the process, for example during compilation, implementation or interpretation of the code, during implementation of the interface functions entered in the table or while implementing the graphically represented interface functions. However, it is particularly advantageous if this plausibility test is carried out during the editing of the code, the table or the graphically represented interface. For example, command sequences, interface functions or symbols which are implausible can be marked in colour.

The following, for example, can be provided as interface functions:
  allocation of an internal connection 101 . . . 105 to an external connection 201 . . . 206
  scaling of a value transmitted between the at least one internal connection 101 . . . 105 and the at least one external connection 201 . . . 206
  conversion of a unit of a value transmitted thus
  transformation of a data format of a value transmitted thus
  inversion of a value transmitted thus
  time-delay of a value transmitted thus.

The operating parameters which are provided for controlling the welding power source 31, 41, 51, 61, 71, 81, 91 and the values of which can also be transmitted via the interface 32, 42, 52, 62, 72, 82, 92 are for example:
welding current
welding voltage
current frequency
pulse rate
pulse duration
pulse-width ratio
operating state
system time In addition to the direct programming of the (physical) interface 32, 42, 52, 62, 72, 82, 92, it is also possible to create an interface definition using a model of the interface 32, 42, 52, 62, 72, 82, 92 and a model, connected thereto, of a machine connected thereto (thus in the specific example, using a model of the welding robot 26 or using a model of the control means 30 thereof), which interface definition is subjected to a plausibility test. Only if the result of the plausibility test is positive will the interface definition be transferred into the real interface 32, 42, 52, 62, 72, 82, 92. Of course, in this variant as well, it is possible for plausibility tests to be carried out for the individual requests of interface definitions in the model during the creation or editing of the interface definition, as previously mentioned.

It is advantageous when the outer form of the interface function symbols is configured such that the interface function symbols fit together like puzzle pieces when the allocated interface functions match one another functionally. It is likewise advantageous when the outer form of the interface function symbols and of the interface symbol is configured such that the interface function symbols and the interface symbol fit together like puzzle pieces when the allocated interface functions functionally match the at least one input and/or the at least one output. FIGS. 10 to 23 show some examples of this.

Figure 10:
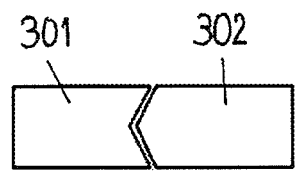
FIG. 10 shows a first example of how graphic interface function symbols can be combined in the manner of a puzzle.

FIG. 10 shows an example of a combination of an interface function symbol 301 with an interface function symbol 302. On the left-hand side, the interface function symbol 302 has an arrow-shaped end which fits into a corresponding recess in the interface function symbol 301. In this manner, when the interface function symbols are joined together, i.e. when an interface definition is being created or edited, it is clear which interface function symbols fit together and which do not. A signal path, here from right to left, can also be visualised through the arrow-shaped recess to further simplify the creation of an interface definition. However, in principle, the signal in FIG. 10 can also flow from left to right.

Figure 11:
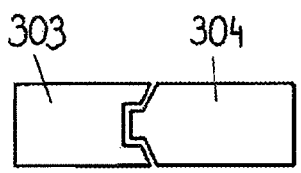
FIG. 11 shows a second example of how graphic interface function symbols can be combined in the manner of a puzzle with a different outer form of the interface function symbols.

FIG. 11 shows a further example of a combination of an interface function symbol 303 with an interface function symbol 304. On the left-hand side, the interface function symbol 304 has an arrow-shaped end with a peg-shaped extension; the interface function symbol 303 has a correspondingly mirror-inverted end. The advantages mentioned in respect of FIG. 10 apply here analogously.

Figure 12:
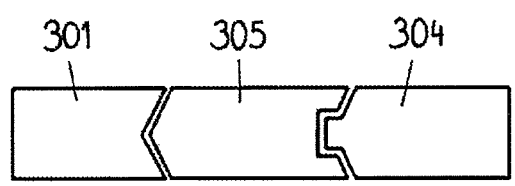
FIG. 12 shows a third example of how graphic interface function symbols can be combined in the manner of a puzzle with three combined interface function symbols.

FIG. 12 shows a combination of three interface function symbols 301, 305 and 304. The interface function symbol 305 allows the combination of the interface function symbols 301 and 304 already shown in FIGS. 10 and 11.

Figure 13:
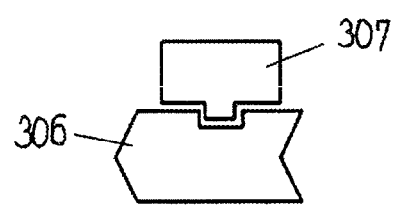
FIG. 13 shows a fourth example of how graphic interface function symbols can be combined in the manner of a puzzle with laterally connected interface function symbols.

Furthermore, FIG. 13 indicates that the combination of interface function symbols can occur not only horizontally but also in a vertical direction. Purely by way of example, an interface function symbol 306 is shown with a rectangular indentation arranged in the upper side thereof, into which a peg-shaped extension of an interface function symbol 307 projects.

Figure 14:
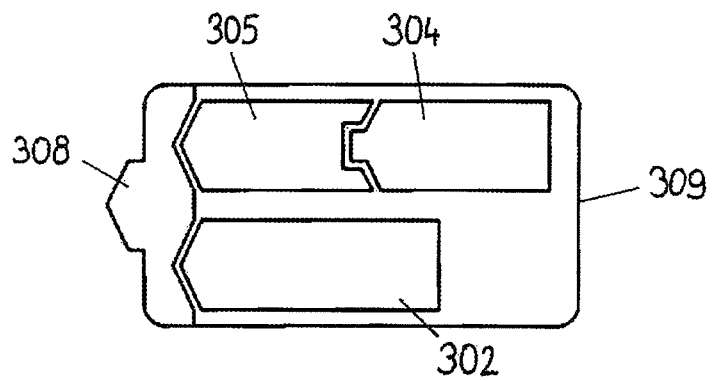
FIG. 14 shows a combination of a plurality of branches of interface function symbols in one group.

FIG. 14 shows furthermore that different strands of interface function symbols can also be combined together. Purely by way of example, the interface function symbol 305 which is connected to the interface function symbol 304, and the interface function symbol 302 are combined via the interface function symbol 308. In addition, a group consisting of the interface function symbols 302, 304, 305 and 308 is formed with the symbol 309.

It is pointed out here that in the previous embodiments, it has merely been shown until now how the interface function symbols 301 . . . 309 can be combined together, but not how they cooperate with an interface symbol. For example, the illustration of an internal connection 101 . . . 105 or of an external connection 201 . . . 206 can have an arrow-shaped indentation (like interface function symbol 301) or an arrow-shaped bulge (like interface function symbol 302), to indicate the possibility of the combination with the interface function symbol 302 and with the interface function symbol 301.

Furthermore, in the previous embodiments, it has merely been shown until now how the interface function symbols can appear in order to be combined in the manner of a puzzle. However, the interface function symbols have not yet been allocated to interface functions. Thus, the following figures show which interface function symbols can represent which interface functions.

Figure 15:
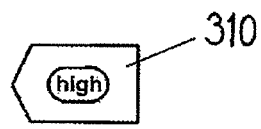
FIG. 15 shows an example of an interface function symbol with the function "state allocation"

In FIG. 15, for example the interface function symbol 302, basically already known from FIG. 10, is expanded into an interface function symbol 310 which, purely by way of example, is used to allocate a state. Specifically, the state "high" is allocated to the internal connection 101 . . . 105 or to the external connection 201 . . . 206 of the interface 32, 42, 52, 62, to which the interface function symbol 310 is added.

Figure 16:
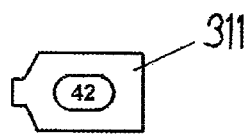
FIG. 16 shows an example of an interface function symbol with the function "value allocation"

Similarly, in FIG. 16, the interface function symbol 304, basically already known from FIG. 11, is expanded into an interface function symbol 311 which, purely by way of example, is used to allocate a value. Specifically, the value "42" is allocated to the internal connection 101 . . . 105 or to the external connection 201 . . . 206 of the interface 32, 42, 52, 62, to which the interface function symbol 311 is added.

Figure 17:
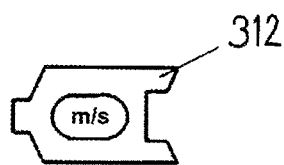
FIG. 17 shows an example of an interface function symbol with the function "unit conversion"

FIG. 17 shows an interface function symbol 312 which purely by way of example, is used for the conversion of units. Specifically, values transmitted via the interface 32, 42, 52, 62 are converted into "m/s" using the interface function symbol 312 (for example from inch/s).

Figure 18:
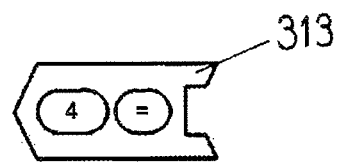
FIG. 18 shows an example of an interface function symbol with the function "value query"

The interface function symbol 313 shown in FIG. 18 is used purely by way of example to request values. As an example, a value "4" is provided which is fed in on the right-hand side of the interface function symbol 313.

Figure 19:
FIG. 19 shows an example of an interface function symbol with the function "invert"

FIG. 19 shows an interface function symbol 314 for inverting values. If, for example, the value "0" is fed in on the right-hand side of the interface function symbol 314, then the interface function allocated to the interface function symbol 314 outputs the value "1".

Figure 20:
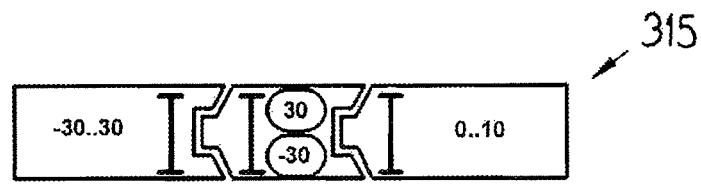
FIG. 20 shows an example of an interface function symbol group with the function "scale"

FIG. 20 shows by way of example an arrangement 315 of interface function symbols used for scaling values. For example, a value range of 0 . . . 10, fed in on the right-hand side of the arrangement 315 is presented on the left-hand side on −30 . . . 30.

Figure 21:
FIG. 21 shows an example of an interface function symbol group with the function "time query"

Furthermore, FIG. 21 shows an example of an arrangement 316 for requesting a system time "time". Specifically, the system time "21:00" is read out. This value can then be further processed, for example, in any desired manner. For example, the welding power source 31 and the control means 30 of the welding robot 26 can thus be synchronised in time.

Figure 22:
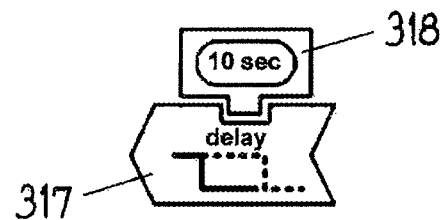
FIG. 22 shows an example of an interface function symbol group with the function "time delay"

In FIG. 22, the interface function symbols 306 and 307, basically already known from FIG. 13, are expanded into interface function symbols 317 and 318. The illustrated arrangement is used purely by way of example for the time delay during the transmission of a value. Specifically, a value, fed in on the right-hand side of the interface function symbol 317 is delayed by 10 seconds, before it is output on the left-hand side.

Figure 23:
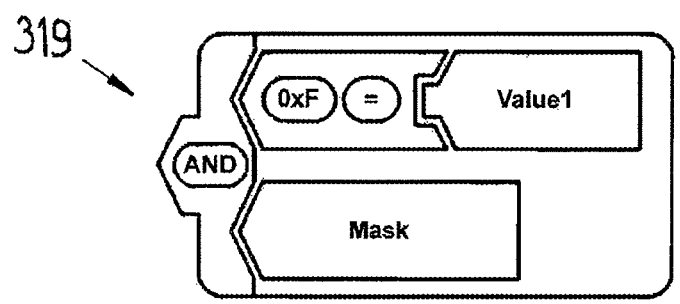
FIG. 23 shows an example of an interface function symbol group with the function "AND link"

FIG. 23 shows by way of example an arrangement 319 of interface function symbols, which arrangement is based on the arrangement of FIG. 14. Specifically, a value "value 1" is read out which has the hexadecimal value "0xF". This is linked by AND with a mask "mask". The result is output on the left-hand side of the arrangement 319.

In FIGS. 10 to 23, interface function symbols have been shown which fit together like puzzle pieces when the allocated interface functions match one another functionally. However, it is also possible for the coloured appearance of the interface function symbols to be configured such that the interface function symbols match in terms of colour when the allocated interface functions are a functional match. It is equally conceivable for the coloured appearance of the interface function symbols and of the interface symbol to be configured such that the interface function symbols and the interface symbol match in terms of colour when the allocated interface functions functionally match the at least one input and/or the at least one output.

Figure 24:
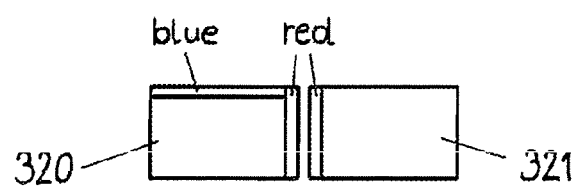
FIG. 24 shows an example of how coloured interface function symbols can be combined.

FIG. 24 shows an example of this, more specifically in the form of an interface function symbol 320 which is combined with an interface function symbol 321. The right-hand edge of the interface function symbol 320 is coloured red and the upper edge is blue. In contrast, the left-hand edge of the interface function symbol 321 is red. It is assumed that the interface function symbols 320 and 321 are otherwise neutral in colour. Here as well, a user of the method according to the invention can immediately see that the interface function symbol 320 can be combined with the interface function symbol 321, even if the form per se of the interface function symbols 320 and 321 gives no indication of this.

The arrangement shown in FIG. 24 is to be seen purely as an example. In addition to the illustrated colour configuration, interface function symbols can be coloured in any complex fashion to indicate the possibility of a combination with another interface function symbol.

Of course, interface function symbols can be configured like puzzle pieces as well as being differentiated in terms of colour, so that it is particularly easy to see which interface function symbol can be combined with which other interface function symbol or with which internal connection 101 . . . 105 or external connection 201 . . . 206.

In general, the interface 32, 42, 52, 62, 72, 82, 92, regardless of whether it is represented as a program code, a table or by graphic symbols, can be programmed directly at the welding power source 31, 41, 51, 61, 71, 81, 91 or at a detached personal computer. In the case of a personal computer, the interface definition is created using a model of the interface 32, 42, 52, 62, 72, 82, 92 and a model, connected thereto, of the machine connected to the welding power source 31, 41, 51, 61, 71, 81, 91. The programming is thus carried out "offline", thereby making it possible to avoid expensive downtimes of the welding power source 31, 41, 51, 61, 71, 81, 91 or of the machine connected thereto (for example of the welding robot 26). Likewise it is possible to create the interface definition before the installation of the welding power source 31, 41, 51, 61, 71, 81, 91 or of the welding robot 26, so that the start-up can take place quickly. Finally, it is also possible to maintain the interface 32, 42, 52, 62, 72, 82, 92 from a distance. Expensive journeys undertaken by technical staff can be avoided as a result.

In conclusion, it is pointed out that the welding robot 26 is only one embodiment of a machine connected to a welding power source 31, 41, 51, 61, 71, 81, 91. It is also possible for the welding robot 26 to be of a different type. For example, it can be configured as a gantry robot.

The embodiments show possible configuration variations of a welding power source 31, 41, 51, 61, 71, 81, 91 according to the invention, it being pointed out here that the invention is not restricted to the specifically illustrated variants thereof, instead diverse combinations of the individual variants among one another are also possible and this variation possibility lies within the capabilities of a person skilled in this technical field due to the directive for technical actions by the objective invention. Thus, all conceivable variants which are possible through combinations of individual details of the illustrated and described variants are also included within the scope of protection.

In particular, it has been established that the interface 32, 42, 52, 62, 72, 82, 92 can also be connected to further units which are present in addition to the actual power source and are usually required for welding. For example, the interface 32, 42, 52, 62, 72, 82, 92 can be connected to magnetic valves, pressure controllers and the like for controlling a stream of welding gas, or to pumps and ventilators for cooling the welding torch etc. In this sense, a "welding power source" 31, 41, 51, 61, 71, 81, 91 is not understood as meaning just a power source as such, but also a power source with additional units. In particular, the welding power source 31, 41, 51, 61, 71, 81, 91 according to the invention can include the features which have been mentioned in respect of FIG. 1 and which can also be connected to the interface 32, 42, 52, 62, 72, 82, 92 according to the invention in a particular embodiment.

Figure 25:
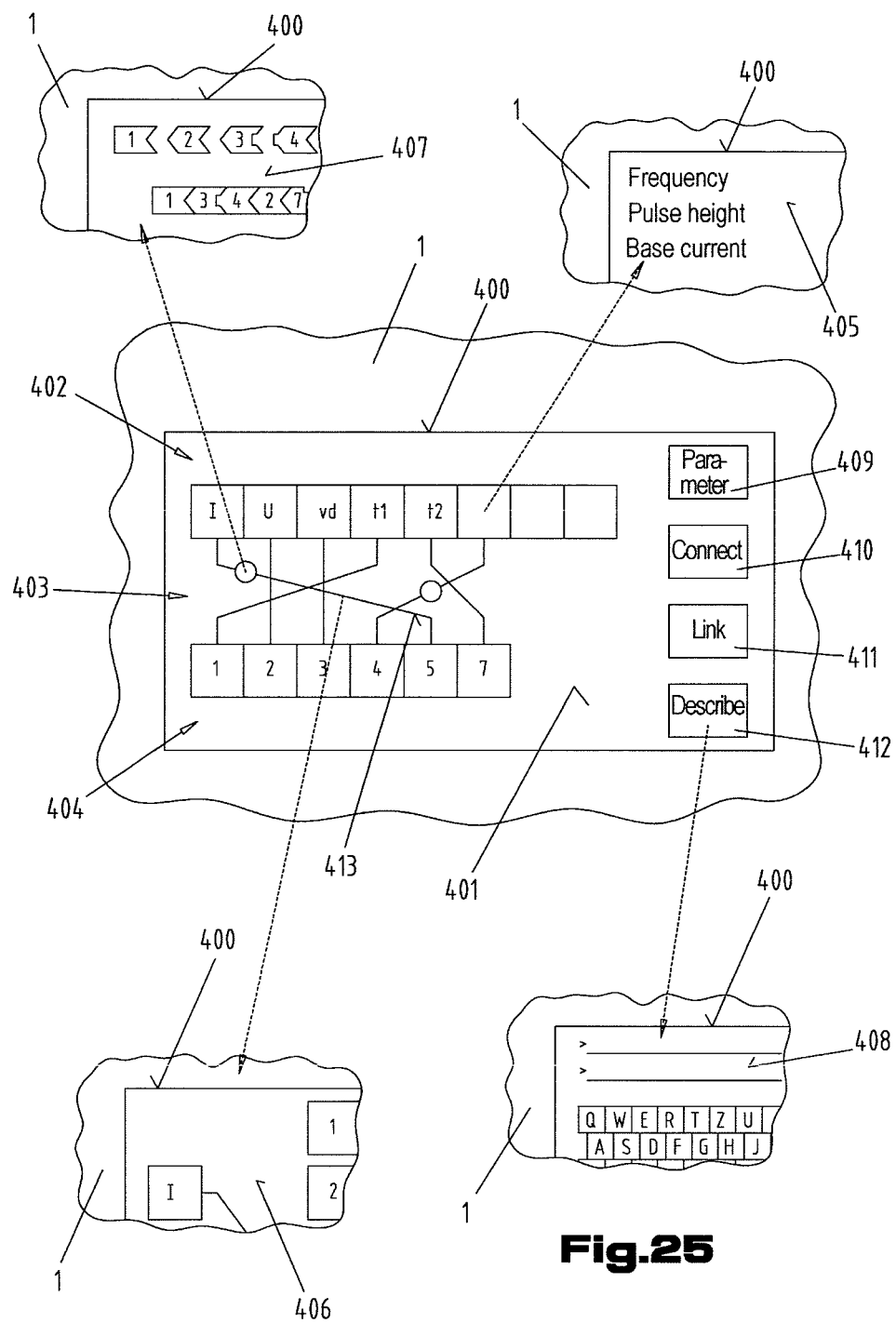
FIG. 25 shows an embodiment of a configuration of the interface from the welding device 1.

FIG. 25 shows a schematic, simplified illustration for configuring the interface via an operating panel 400 of the input and/or output device 19 directly from the welding device 1. The difference compared to the previously described embodiments is that in this use, no internal connections 101 . . . 105 are present, but the allocation takes place in a direct manner. For this purpose, an enlargement of the operating panel 400, for example from the welding plant shown in FIG. 1 is shown. It is pointed out that the sequence of operations and the formation as well the mode of operation is shown only as an example of the disclosure of the use at the welding device 1, although implementation is also possible in a different manner.

A touch screen is preferably used as the operating panel 400 so that the operator can select diverse display elements by touch alone. It is also possible for the operator to freely configure the surface, i.e. the user can reposition the individual fields, symbols, graphics, texts etc. by clicking and relocating, in which case the user switches over the control device 4 or the welding device 1 into a mode provided for this purpose. It is also possible for this mode, in particular a positioning mode, to be called up by repeatedly quickly pressing on a field, a symbol, a graphic etc. or the mode can be initiated by holding down the field etc. for a relatively long time.

It is significant that, by calling up an appropriate menu, in particular an interface mode, the user is able to configure the interface (not shown) which is arranged in the welding device 1 directly at the welding device 1. For this purpose, a freely configurable interface is arranged in the welding device 1, the interface being directly controlled, configured and activated in terms of software via the operating panel 400 of the welding power source.

In this regard, FIG. 25 shows for example a main menu 401 of the operating panel 400 in interface mode with a parameter region 402 for defining the required parameters, a linking region 403 and an output region 404 of the external connections, as well as symbolically opening submenus 405 to 408 (which are only shown as extracts) from which the user can then select a plurality of possibilities which are transferred into the main menu 401. Furthermore, buttons are provided for calling up different functions, such as parameter 409, connect 410, link 411 and describe 412, for which in turn the or other submenus 405 to 408 are called up.

However, these functions can also be called up when the user presses the displays so that a correspondingly stored function is called up.

The user then has the opportunity of allocating any parameter of the welding device 1 from the parameter region 402 to any external connection 101 . . . 105 of the connection region 404 and of changing this parameter by simply pressing an appropriate symbol in the parameter region 402, whereupon a submenu 405 with a list of parameters is opened. He selects the parameter from this list simply by clicking, whereupon this parameter or an abbreviation thereof is indicated at the symbol in the main menu 401. The same function could also be performed by the parameter button 79.

After the user has selected one or all the parameters, he can allocate each parameter to an external connection. For example, upon activating the "connect" button 410, the linking region 403, in particular the submenu 406 can be activated, so that the user can now freely decide which selected parameter in the parameter region 402 is allocated to which external output in the output region 404 and this is then presented graphically in the form of connection lines 413, i.e. for example the parameter "I" (welding current) in parameter region 402 is allocated to the external output "5" in the output region 404 by the user by clicking on both symbols, and at the end of the procedure the connection line 413 is presented so that the user receives a visual presentation.

Furthermore, the user has the possibility of creating a link by stringing together software graphic symbols, for which he presses the "link" button 411 or presses the connection line 413. This in turn calls up a submenu 407 where the user is presented with the different graphic symbols. In this respect, it is possible that simply by pressing and then relocating, the symbols are strung together and thus a corresponding link can be created, as already mentioned in the previously described figures. When a link is created, it is represented, for example, by a circular symbol in the connection line 413, so that the user can see at one glance that a link has been stored for this allocation. As already mentioned in the embodiments of the previously described figures, the links can contain functions, allocations and definitions etc.

If the user operates the "description" button 412, for example, a submenu 408 is opened in which the user can add any text for any function or even general text which is stored accordingly in the welding device 1. For this purpose, a type of keyboard is superimposed so that the input options of the welding device 1 are increased and thus text inputs are also possible.

Naturally, it is possible that the interface is already predefined by the manufacturer and the user only has to make changes, i.e. when calling up this mode, the already configured interface with the parameters, connections and links is presented and the user can then make further adaptations, changes and additions.

It is also possible that the user deletes an already existing interface configuration or that a plurality of interface configurations can be saved which the user can recall at any time. The configurations are preferably saved on a storage medium arranged in the welding device 1. For this, it is also possible for a "save" button to be provided. In addition, further buttons can also be provided which have not been shown or mentioned in the illustrated and described embodiments.

Furthermore, a debugging means is integrated for tracking and testing the data exchange and the data allocation, as a result of which a detailed error analysis is possible using said debugging means. It is thereby possible to record individual signals and/or variables and/or to simulate sequences, the recorded signals being presented in a so-called graph (i.e. a presentation as on an oscilloscope) or as text.

Furthermore, it is possible to subsequently analyse past events. For this purpose, a list is made of current events and is stored so that it can be accessed at a later stage. In this respect, the recording is carried out in a ring buffer so that it is possible to have a specific period of time for debugging available at any time of the implementation, i.e. the individual items of data are stored successively in time in the ring buffer and it is then possible for the user to call up the individual times with the associated data step-by-step and to look at them. The user can do this directly at the welding device or, when the welding device is connected to a computer, looked at via the computer. A procedure of this type is known as "post mortem debugging". In this respect, it is also possible for the size of the ring buffer to be freely configurable.

Triggers can be defined for the starting and stopping of a recording. The length of recording time before or after the trigger event can be distributed in any manner over the available ring buffer. The trigger itself is initiated by adjustable signal states.

Furthermore, a so-called live debugging is possible in which the actual states of the individual variables, functions or inputs/outputs are presented visually, without changing the sequence of the program, i.e. the user is able to directly follow the manner in which the interface, which he has configured, is working. In this respect, it is possible to set a break point anywhere in the program sequence and thus to look at the current state at a specific point in the program sequence. Furthermore, the sequence can be continued step-by-step following directions (step debugging). In order to be able to simulate specific situations, it is possible to allocate specific states to individual signals and/or variables, so that the user can also definitively test special cases which only occur very rarely.

In addition, it is possible that due to the debugger, a simulation of the interface configuration can be performed, where "simulation" is understood as meaning that the program sequence is simulated virtually offline. For this purpose, all the points mentioned for debugging are also available in offline mode.

In principle, it should be mentioned that a method for defining an interface 32, 42, 52, 62 of the welding power source 31, 41, 51, 61, in particular of the welding device 1, for communication with an external machine 26 (not shown) which is connected to the interface is described, the interface for communication with the machine 26 connected to the welding power source 31, 41, 51, 61 preferably being configured for a parallel data communication and comprising at least one external connection, a use of a freely configurable interface in the welding device 1 being required, the interface being controlled, configured and activated in terms of software directly via the operating panel 70 of the welding power source 31, 41, 51, 61 or an external device which can be connected to the welding power source 31, 41, 51, 61, in particular an operating panel, and that a parameter of the welding device 1 is allocated to an internal and/or external connection and optionally a link is created by stringing together graphic symbols of a piece of software.

As a matter of form, it is finally pointed out that to gain a clearer understanding of the construction of the welding robot 26, said robot or the components thereof have to some extent been shown not to scale and/or on a large scale and/or on a small scale.

The object on which the independent inventive solutions are based can be learnt from the description.

LIST OF REFERENCE NUMERALS

1 Welding device
2 Power source
3 Power part
4 Control device
5 Gas
6 Gas tank
7 Welding torch
8 Wire feed device
9 Welding wire
10 Feed drum
11 Housing
12 Carriage
13 Arc
14 Work piece
15 Cooling device
16 Water tank
17 Fill level indication
18 Input and/or output device
19 Welding torch input and/or output device
20 Heat protection shield
21 Hose assembly
22 Kink protector
23 Abrasion protector
24 Option carrier
25 Holding device
26 Welding robot
27 Robot base
28 Robot arm
29 Welding head
30 Robot control means
31, 41, 51, 61, Welding power source
71, 81, 91
32, 42, 52, 62, Interface
72, 82, 92
33, 43, 53, 63, Processor
73, 83, 93
64 Model of welding power source
65 Model of interface
66 Model of welding robot
101 . . . 105 Internal connections
201 . . . 206 External connections
301 . . . 307 General interface symbol
308 Interface function symbol "combine"
309 Group symbol
310 Interface function symbol "state allocation"
311 Interface function symbol "value allocation"
312 Interface function symbol "unit conversion"
313 Interface function symbol "value query"
314 Interface function symbol "invert"
315 Interface function symbol group "scale"
316 Interface function symbol group "time request"
317, 318 Interface function symbol group "time delay"
319 Interface function symbol group "AND link"
320, 321 Coloured interface function symbols
400 Operating panel
401 Main menu
402 Parameter region
403 Linking region
404 Output region
405 . . . 408 Submenu
409 "Parameter" function
410 "Connect" function
411 "Link" function
412 "Describe" function
413 Connection line

The invention claimed is:

1. A method for configuring an interface of a welding power source of a welding device, the interface including a plurality of external connections collectively configured to connect to a single external machine, the interface further including at least one internal connection, wherein:
  the interface is represented on an operating display panel as a graphic interface symbol of its at least one internal connection and of at least one of its plurality of external connections;
  the interface provides one or more interface functions, the functions being represented on the operating display panel as graphic interface function symbols,
  it is possible for an interface function symbol to be arranged on the operating display panel between the at least one internal connection and the at least one external connection of the graphic interface symbol in order to functionally link the at least one internal connection with the at least one external connection of the interface via the allocated interface function, wherein:
    on the operating display panel, an outer form of the graphic interface function symbols and of the graphic interface symbol is configured such that the graphic interface function symbols and the graphic interface symbol fit together like puzzle pieces and/or match in terms of color when the allocated interface functions functionally match at least one of the at least one internal connection and the at least one external connection of the interface; and
    on the operating display panel, the outer form of the graphic interface function symbols is configured such that the graphic interface function symbols fit together like puzzle pieces and/or match in terms of color when the allocated interface functions match one another functionally;
  the graphic interface symbol and the graphic interface function symbols are used for configuring the interface;
  a parameter of the welding device is displayed in a parameter region of the operating display panel;
  the graphic interface symbol of the at least one external connection is displayed in an output region of the operating display panel;
  the parameter of the welding device is allocated to at least one of the internal and external connections of the interface by a user activating, on the operating display panel, a linking region connecting the parameter region and the output region; and the interface functions are logically linked via the linking region by stringing together graphic interface function symbols presented to the user on the operating display panel.

2. The method according to claim 1, wherein at least one of the following groups is provided as the parameter of the welding device: welding current, welding voltage, current frequency, pulse rate, pulse duration, pulse-width ratio, operating state, and system time.

3. The method according to claim 1, wherein:
a model of the welding power source is represented as a set of programming commands, and
a programming command allocates at least one value to at least one parameter.

4. The method according to claim 1, wherein:
a model of the welding power source is represented as a table, and
a cell of the table contains at least one value of at least one parameter.

5. The method according to claim 1, wherein a model of the welding power source is represented as a graphic symbol and at least one parameter is represented as an input symbol and an input of at least one value allocates the mentioned value to the at least one parameter in the case of the input symbol.

6. The method according to claim 1, wherein the interface comprises an interface definition comprising one or more interface functions from a group of interface functions including an allocation of an internal connection to an external connection of the interface, scaling of values transmitted via the interface, conversion of a unit of a value transmitted thus, transformation of a data format of a value transmitted thus, inversion of a value transmitted thus and time delay of a value transmitted thus.

7. The method according to claim 1, wherein:
the interface is represented as a set of programming commands, and
a programming command functionally links the at least one internal connection with the at least one external connection via an interface function.

8. The method according to claim 1, wherein the interface is represented as a table, wherein a cell of the table is allocated to at least one internal connection and to at least one external connection of the interface and contains an interface function which functionally links the at least one internal connection with the at least one external connection of the interface.

9. A welding power source of a welding device having an interface, comprising:

an input configured to input at least one value for at least one parameter of the welding power source, the interface comprising a plurality of external connections collectively configured to connect to a single external machine, the interface further comprising at least one internal connection, wherein:

the interface is represented on an operating display panel as a graphic interface symbol of its at least one internal connection and of at least one of its plurality of external connections, the interface provides one or more interface functions, the functions being represented on the operating display panel as graphic interface function symbols, such that a graphic interface function symbol is arrangeable on the operating display panel between at least one internal connection and at least one external connection of the graphic interface symbol in order to functionally link at least one internal connection with at least one external connection via the allocated interface function, wherein:

on the operating display panel, an outer form of the graphic interface function symbols and of the graphic interface symbol is configured such that the graphic interface function symbols and the graphic interface symbol fit together like puzzle pieces and/or match in terms of color when the allocated interface functions functionally match at least one internal connection and at least one external connection of the interface; and on the operating display panel, the outer form of the graphic interface function symbols is configured such that the graphic interface function symbols fit together like puzzle pieces and/or match in terms of color when the allocated interface functions match one another functionally;

the graphic interface symbol and the graphic interface function symbols are usable for configuring the interface;

a parameter of the welding device is displayed in a parameter region of the operating display panel;

the graphic interface symbol of the at least one external connection is displayed in an output region of the operating display panel;

the input is configured to allocate the parameter of the welding device to at least one of an internal and external connection by a user activating on the operating display panel a linking region connecting the parameter region and the output region, the input further configured for establishing a logical link of the interface functions via the linking region by stringing together the graphic interface function symbols presented to the user on the operating display panel.

* * * * *